United States Patent [19]

Loveless

[11] Patent Number: 4,679,644

[45] Date of Patent: Jul. 14, 1987

[54] CHIN ACTUATED CONTROLLER SYSTEM FOR CONTROLLING POWERED APPARATUS

[75] Inventor: John H. Loveless, Westminster, Md.

[73] Assignee: The Johns Hopkins University, Baltimore, Md.

[21] Appl. No.: 799,712

[22] Filed: Nov. 19, 1985

[51] Int. Cl.[4] .............................................. B62D 11/04

[52] U.S. Cl. .................................... 180/6.5; 180/907; 200/DIG. 2

[58] Field of Search ........................ 180/6.5, 316, 907; 318/51, 54, 65; 200/52 R, DIG. 2; 3/1.1

[56] References Cited

U.S. PATENT DOCUMENTS 4,078,627 3/1978 Brown et al. ...................... 180/907

4,260,035 4/1981 Loveless et al. .................... 180/6.5

*Primary Examiner*—John A. Pekar

*Attorney, Agent, or Firm*—Robert E. Archibald; Carl I. Brundidge

[57] ABSTRACT

The chin actuated controller system includes a control arm mounted at one end for pivotal movement in both the horizontal and vertical directions and a chin pad supported by the distal end of the control arm which extends to a location adjacent to the chin of a person. The chin pad which includes a chin switch is engageable by the person's chin to cause vertical and horizontal motion of the control arm and forward and reverse and movement of the chin switch. A cam mechanism in combination with a controller electrical circuit is used to convert the chin activated movements of the control arm and chin switch combination to an electrical signal which controls the powered apparatus. The controller electrical circuit also includes additional electrical circuits which provide for electrical switching between the various powered apparatus operations, logic control of the various powered apparatus operations and an audible sound indicating the initiation of the powered apparatus operation selected by the person.

47 Claims, 7 Drawing Figures

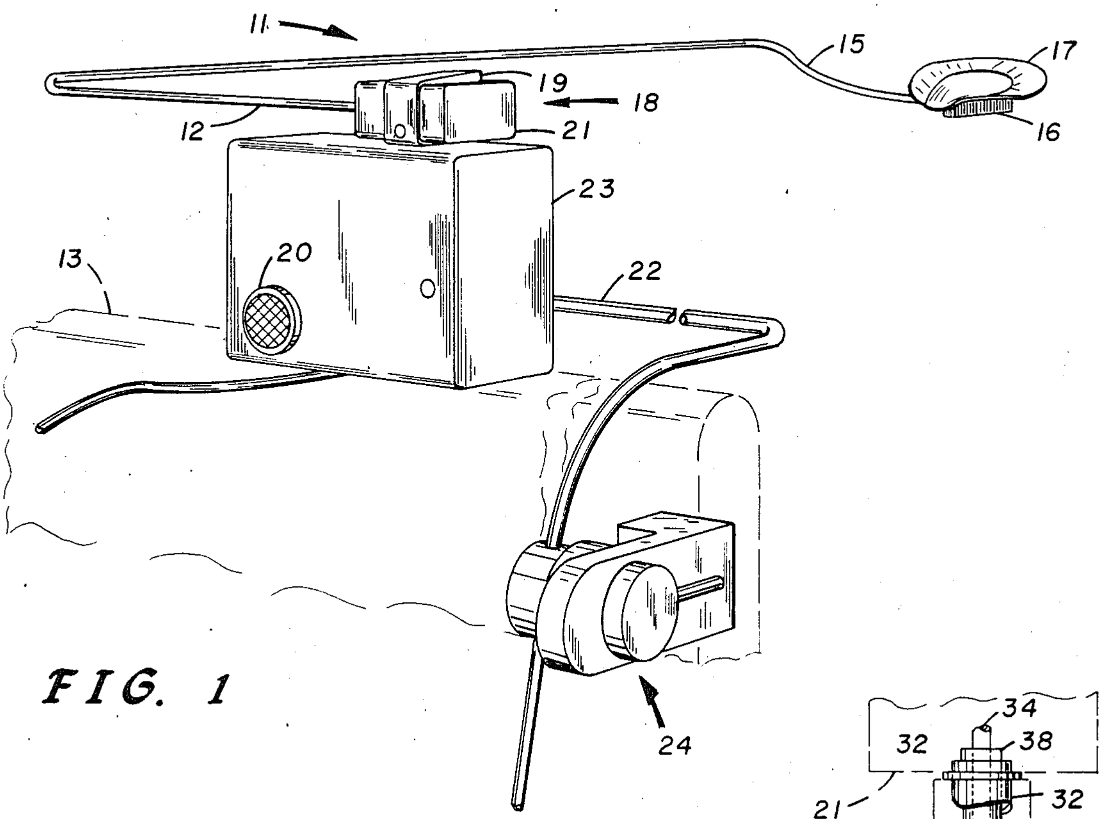
FIG. 1
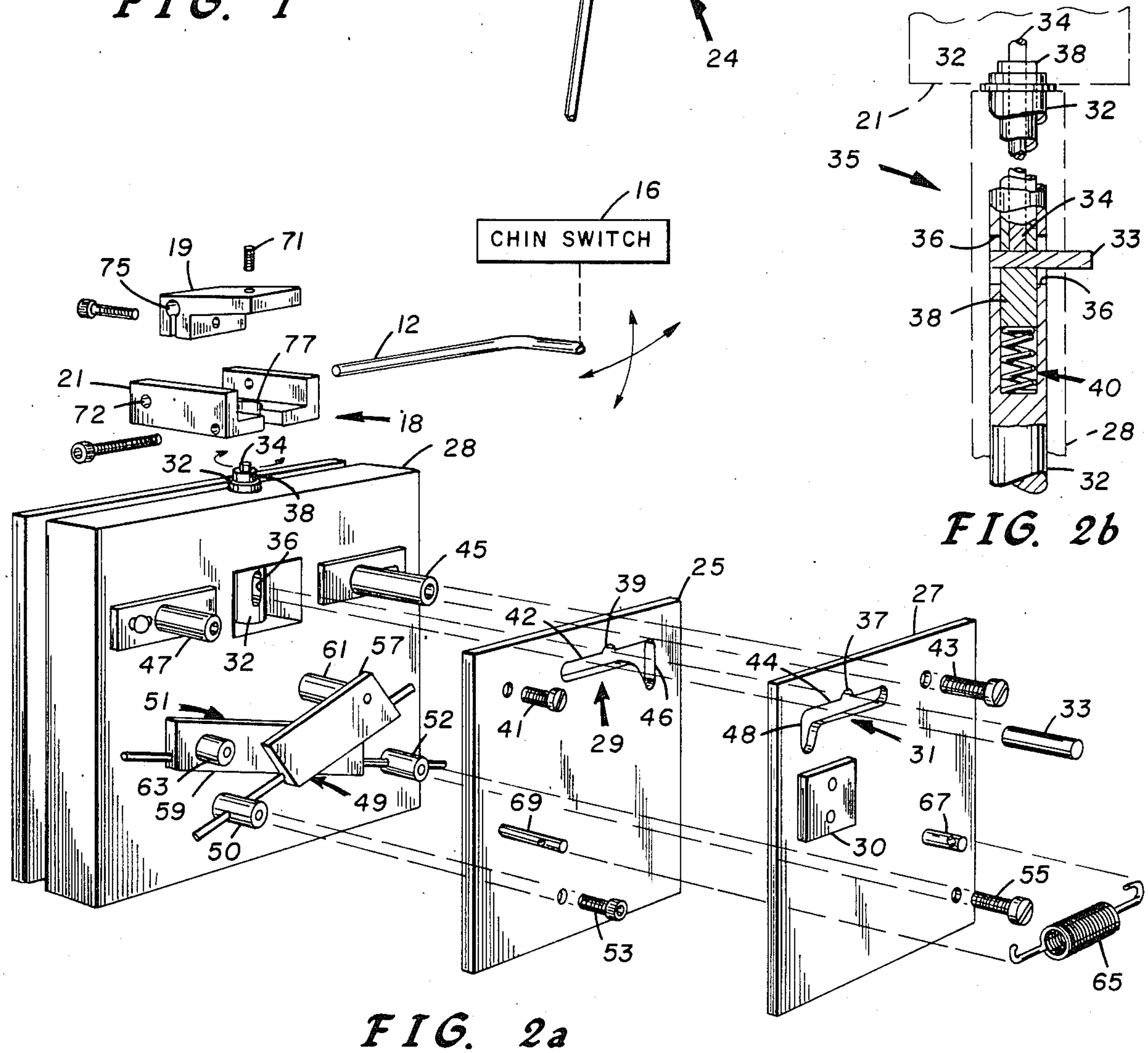
FIG. 2a
FIG. 2b

CHIN ACTUATED CONTROLLER SYSTEM FOR CONTROLLING POWERED APPARATUS

STATEMENT OF GOVERNMENTAL INTEREST

The Government has rights in this invention pursuant to contract no. N00024-85-C-5301 awarded by the Department of the Navy.

BACKGROUND OF THE INVENTION

1. Technical Field

The present invention relates to controller systems for controlling powered apparatus and more particularly to a chin actuated controller system for controlling powered apparatus.

2. Discussion of the Prior Art

Quadriplegic persons, such as those suffering from high spinal chord injury, are often able to operate a powered apparatus which may be a powered wheelchair, if the apparatus is equipped with a chain actuated controller system, whereby the occupant controls or commands desired operation of the wheelchair by means of slight chin movements. Various mechanisms have been proposed in the prior art for permitting a quandriplegic person to operate a powered apparatus. For example U.S. Pat. No. 4,078,627 discloses essentially a joystick whose end is equipped with an enlarged rubber cup, designed to fit over and engage the patient's chin. The joystick is then moved relative to its central position by the patient's chin movements, e.g. forward and back in order to select forward and reverse directions of travel respectively, with speed dependent upon the amount of displacement of the joystick from its central position, and proportionate steering control being accomplished by chin movement of the joystick to the left or right of center. This conventional joystick-type chin controller is rather bulky in design and is objectionable for some users in that it remains positioned in front of the user's face until removed by an attendant.

Another prior art mechanism is that disclosed in the applicant's prior U.S. Pat. No. 4,260,035 which is also assigned to the assignee of applicant's present invention. In the applicant's prior patent there is provided a chin controller system having an elongated control arm which extends unobtrusively to a location adjacent to the occupant's chin and there supports a low profile actuator mechanism. Depression of the actuator provides proportional speed control of the wheelchair. In addition, lateral movement of the actuator from side-to-side in a horizontal plane provides proportional left/right steering control of the wheelchair.

The chin controller disclosed in applicant's prior U.S. Pat. No. 4,260,035, was clinically evaluated and the following situations where encountered. The prior controller was subject to damage by the patient or attendant. In addition, the prior controller did not permit the wheelchair to remain stationary and spin about its vertical axis. Even further the prior controller did not allow for the inadvertent change in the patient's position.

OBJECTS AND SUMMARY OF THE PRESENT INVENTION

It is, therefore, an object of the present invention to provide a chin actuated controller system for a powered apparatus responsive to slight chin movement of the user/occupant.

Another object of the present invention is to provide a chin-actuated controller system for a powered apparatus which is not bulky in design.

Yet another object of the present invention is to provide a chin-actuated controller system for a powered apparatus which permits the occupant to move the controller away from the front of the occupant's face.

It is another object of the present invention to provide a chin-actuated controller system for a powered apparatus having the structural strength needed in order to withstand mishandling by the patient or attendant.

Still yet another object of the present invention is to provide a chin-actuated controller system for a powered wheelchair which permits the wheelchair to be rotated in place about a vertical axis.

A further object of the present invention is to provide a chin actuated controller system for a powered apparatus which compensates for the inadvertent change in the patient's position.

A still further object of the present invention is to provide a chin actuated controlled system and apparatus fully compatible with commercially available powered wheelchairs having "X" axis configured joysticks.

In accordance with the present invention, which is an improvement of the system disclosed in U.S. Pat. No. 4,260,035 expressly incorporated herein in its entirety by reference, a chin actuated controller system for a powered apparatus is provided which overcomes the disadvantages associated with prior art controller systems. The chin actuated controller system of the present invention includes a control arm mounted at one end for pivotal movement in both the horizontal and vertical directions and a chin pad supported by the distal end of the control arm which extends to a location adjacent to the chin of the patient. The chin pad which includes a chin switch is engageable by the patient's chin to cause vertical and horizontal motion of the control arm and forward and reverse movement of the chin switch. A cam mechanism in combination with a controller electrical circuit, which includes a power control device, is used to convert the chin activated movements of the control arm and chin switch combination to an electrical signal which controls the powered apparatus. Specifically the electrical signal can be used to control the left and right drive motors of a powered wheelchair, thereby, varying the speed and direction of the powered wheelchair. Additional electrical circuits are included to provide forward and reverse switching and logic control of the various powered apparatus operations. Also included is an audio circuit for producing an audible sound indicating the initiation of various powered apparatus operations selected by the patient.

BRIEF DESCRIPTION OF THE DRAWINGS

The above and still further objects, features and advantages of the present invention will become apparent upon consideration of the following detailed description of specific embodiments thereof, especially when considered in conjunction with the accompanying drawings wherein the like parts of each of the several figures are identified by the same reference numerals, and wherein:

FIG. 1 is a perspective view illustrating a wheelchair equipped with the preferred embodiment of the chin actuated controller system;

FIG. 2*a* is a disassembled view of a cam mechanism to be used in the preferred embodiment of the present invention;

FIG. 2*b* is a sectioned view of a spindle assembly to be used in the preferred embodiment of the present invention;

DESCRIPTION OF THE PREFERRED EMBODIMENT

Figure 3:
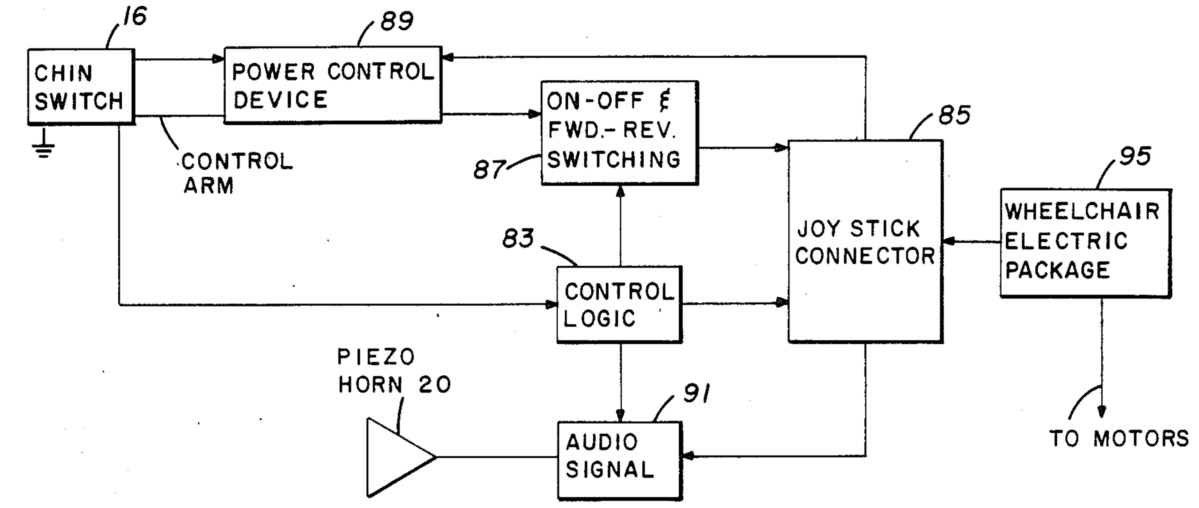
FIG. 3 is a block diagram of a controller electrical circuit to be used in the preferred embodiment of the present invention.

The chin actuated controller system of the present invention is designed to operate a standard Everest and Jennings (E and J) electric wheelchair and other makes which have two drive motors, one for each wheel, an "X" configuration joystick and a wheelchair electrical package including a joystick connector which electrically interfaces the joystick to the wheelchair electrical package which controls the two drive motors. The chin actuated controller system of the present invention replaces the "X" configuration joystick of the powered wheelchair and makes use of the wheelchair electrical package including the joystick connector. In addition to the specific use with a powered wheelchair the chin actuated controller system can be adapted to control any powered apparatus which requires proportional control of the powered apparatus' movements and switch activated selection of different powered apparatus operations. Examples of powered apparatus which can be controlled by the chin actuated controller system are robotic arms, work stations and automobiles.

Referring to FIG. 1, the chin actuated controller system of the present invention is illustrated in combination with a powered wheelchair. As stated above, the present invention can be used to control any powered apparatus, however, for the sake of simplicity henceforth the present invention shall be described in combination with and as being adaptable to a powered wheelchair.

The chain actuated controller system illustrated in FIG. 1 includes a control arm 11 having one end 12 mounted adjacent the rear of the wheelchair 13 and a distal end 15 extending to a location adjacent to the chin of a person occupying the wheelchair 13. A chin pad 17 and chin switch 16 combination is supported at the distal end 15 of the control arm 11. The mounted end 12 of the control arm is connected to a yoke assembly 18 which permits pivotal movement of the control arm and includes a vertical slip joint 19 and a horizontal slip joint 21.

The yoke assembly is operatively connected to a cam mechanism (shown in FIG. 2*a*) by a spindle assembly and a cam operating pin (both shown in FIG. 2*b*). The cam mechanism along with a controller electrical circuit is placed within controller box 23 which is adjustably mounted near the rear of the wheelchair 13 for both horizontal and vertical adjustment by an adjustment arm 22 and adjustment apparatus 24. The controller box 23 also includes a piezoelectric horn 20 electrically connected to the controller electrical circuit. Pivotal movement of the control arm is transmitted through the yoke assembly, spindle assembly and cam operating pin combination to the controller electrical circuit for conversion to an electrical command signal selecting a specific wheelchair operation.

The cam mechanism, illustrated in FIG. 2*a*, includes a first cam 25 having a first slot having a piston shape 29 and a second cam 27 having a second slot having a piston shape 31 and a logic switch 30 which is normally closed when the control arm is in the first vertical, nondepressed position. The second piston shaped slot is placed within the second cam in a position overlapping and pointing in the opposite direction of the first piston shaped slot. The first and second pistol shaped slots each have an elongated horizontal portion 42, 44 integral with a vertical triangular portion 46, 48. The first and second cams having first and second piston shaped slots simulate and in effect provide the same electrical signals as an "X" configuration joystick. The logic switch provides an electrical signal corresponding to the nondepressed and the depressed positions of the control arm.

The cams 25, 27 are pivotally mounted to back plate 28 so that the two pistol shaped slots 29, 31 point in opposite directions and overlap in order to accommodate cam operating pin 33 which passes through the opening created by the two pistol shaped slots 29, 31. The pistol shaped slots 29, 31 each have a detent notch 37, 39 along the upper edge of each piston shaped slot. The first and second cams 25 and 27 each have a point of connection for pivotally mounting the cam for pivotal movement to the back plate 28 by a mounting pin 41, 43 and a spacer 45, 47. A power control device 49, 51, such as a potentiometer, is attached by its operating member 50, 52 to each cam 25, 27, at a second point of connection at a location different from the first point of connection, by a fastener 53,55. The stationary portion 57, 59 of the power control device 49, 51 is attached for pivotal movement to the back plate 28 by a pivotal pin 61, 63. The cams 25 and 27 are biased against pivotal movement by spring 65 which is attached between each cam, at a third point of connection by a spring pin 67, 69.

The cam operating pin 33 as shown in FIG. 2*b*, accommodated by the piston shaped slots perpendicularly extends through a slotted hole 36 in a spindle assembly 35. The spindle assembly 35 includes a spindle tube 32 which holds the cam operating pin 33 in place by a hollow plunger 38, positioned within the spindle tube 32, having a hole for receiving the cam operating pin 33 and a locking pin 34, positioned within the hollow plunger 38. The cam operating pin 33 is locked in stationary position by extending the locking pin 34 through a hole in the cam operating pin 33. The locking pin 34 abuts against a spindle screw 71 of the yoke assembly 18 which will be described in greater detail below. The hollow plunger 38 in combination with the cam operating pin 33 is permitted to move vertically within the spindle assembly 35 and the slotted hole 36. The plunger 38 is biased upwardly pushing the control arm and yoke assembly to the nondepressed vertical position. The upward biasing of the plunger 38 is accomplished by a chamber 40 which may include a spring and a damping fluid such as oil.

The cam operating pin is operatively connected to the control arm by the spindle assembly 35 and yoke assembly 18 combination. The control arm 11 is placed within a vertical slip hole 75 of a vertical slip joint 19 of the yoke assembly 18 and extends through horizontal holes 72 of a horizontal slip joint 21 of the yoke assembly 18. The spindle assembly 35 is placed within a horizontal slip hole 77 of the horizontal slip joint of the yoke assembly 18.

The chin activated pivotal movements of the control arm is transmitted through the yoke assembly, spindle assembly, operating pin and cams for conversion to electrical command signals by the controller electrical circuit schematically illustrated in FIG. 3. The controller electrical circuit includes a chin switch 16, a logic switch 30, a control logic circuit 83, a forward and reverse switching circuit 87, and an audio signal circuit 91. The controller electrical circuit can be placed on a printed circuit board which is positioned adjacent to the second cam 27, within the controller box 23.

The chin switch 16 is a single pole double throw switch which may be a micro switch. Forward and reverse movement of the chin pad moves the chin switch pole from a nonactuated position to an actuated position, wherein, the chin switch is biased to the nonactuated position. Electrical signals are provided by the chin switch corresponding to the nonactuated position and the actuated position. The chin switch poles is electrically connected to a control logic circuit 83 which will be described in greater detail below.

The control logic circuit 83, in response to the electrical signals received from the logic switch and the chain switch, provides a plurality of electrical command signals, namely, a first electrical command signal for initiating forward operation, a second electrical command signal for initiating reverse operation, a third electrical command signal for initiating on-off operation and a fourth electrical command signal for initiating high-speed operation. The third and fourth electrical command signals are provided to the joystick connector 85.

The forward-reverse switching circuit 87 responds to the first and second electrical command signals received from the control logic circuit 83 to control the flow of power between the power source and the power control device 89, thereby selectively initiating forward or reverse wheelchair operation. The forward-reverse switching circuit will be described in greater detail below.

The audio signal circuit 91 responds to the second, third, and fourth electrical command signals received from the control logic circuit and also a lower battery signal received from the wheelchair electrical package to produce an audible sound through a piezo electric horn 20 indicative of the selected wheelchair operation. The audio signal circuit will be described in greater detail below.

The joystick connector 85 as shown in FIG. 3 provides the electrical interface between the wheelchair electrical package and the controller electrical circuit described above. The wheelchair electrical package interface directly to the left and right drive motors of the wheelchair.

Figure 4:
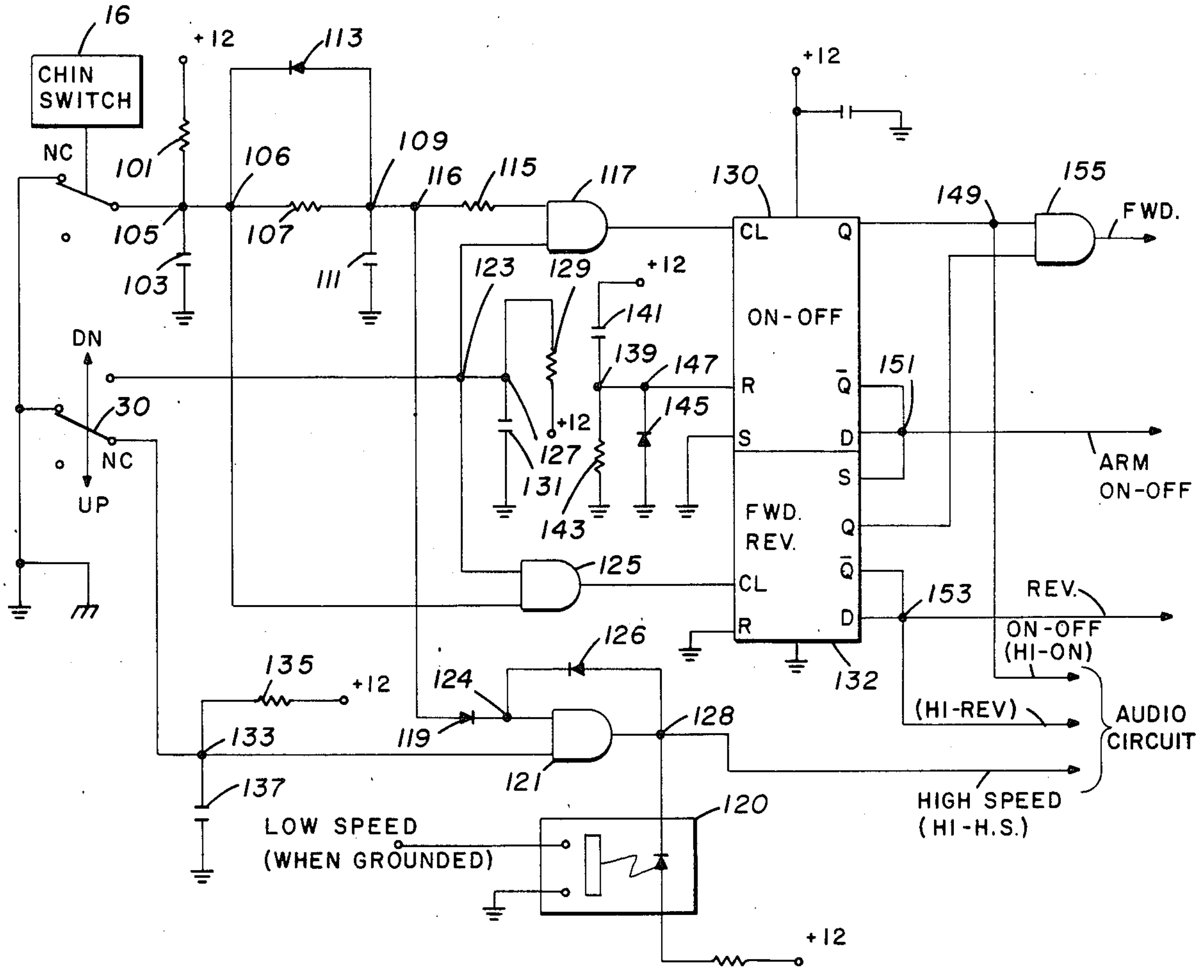
FIG. 4 is a schematic diagram of a control logic circuit of the controller electrical circuit in accordance with the present invention.

The control logic circuit as illustrated in FIG. 4, in greater detail, includes a single pole double throw chin switch 16. The pole of the chin switch is electrically connected to junction point 15 between resistor 101, which is connected to a potential of 12 volts and capacitor 103. Capacitor 103 is connected to ground potential. Junction point 105 is electrically connected to resistor 107 which is electrically connected to junction point 109 between capacitor 111 and the cathode of diode 113. The anode of diode 113 is electrically connected to junction point 106 between junction point 105 and a resistor 107. Junction point 109 is electrically connected to one input of a two input "and" gate 117. A junction point 116, which is electrically connected to junction point 109, is electrically connected to the cathode of a diode 119 which has its anode electrically connected to a junction point 124. Junction point 124 is electrically connected to one input of a two input "and" gate 121. A diode 126 is electrically connected across the "and" gate 121 having its anode connected to junction point 124 and its cathode connected to a junction point 128 which is electrically connected to the output of "and" gate 121. Junction point 128 is electrically connected to the control terminal of an optical switch 120 having its first switching terminal connected to the joystick connector to provide the wheelchair electrical package with a low speed signal and a second switching terminal connected to ground potential. The optical switch is of the type commercially available from "THETA J" Corp. identified as LCA110.

The normally closed single pole double throw logic switch 30, which provides electrical signals to the control logic circuit, is positioned on the second cam 27, and has its pole electrically connected to ground potential. The normally closed position throw, which corresponds to the nondepressed position of the control arm, is electrically connected to the second input of the two input "and" gate 121. The other throw of the logic switch is electrically connected to a junction point 123 between the second input of the two input "and" gate 117 and the first input of a two input "and" gate 125. Junction point 123 is electrically connected to a junction point 127 between resistor 129, which is connected to a potential of 12 volts, and a capacitor 131 which is connected to ground potential. A junction point 133 is provided on the electrical connection between the normally closed position throw of the logic switch 30 and the second input of "and" gate 121. Junction point 133 electrically connects resistor 135, which is connected to a potential of 12 volts, to capacitor 137, which is electrically connected to ground potential.

The output of "and" gate 117 is electrically connected to the first clock pin of a "D" type flip flop chip 130 such as that commercially available from RCA Corp. and identified by CD4013. A junction point 139 provides an electrical connection between resistor 143, which is electrically connected to ground potential, and capacitor 141 which is electrically connected to a potential of 12 volts. Junction point 139 is electrically connected to a junction point 147 which is electrically connected to the first reset pin of the flip flop chip 130. In addition, the anode of a diode 145 is electrically connected to junction point 147. The cathode of diode 145 is electrically connected to ground potential. The first set pin of flip flop chip 130 is electrically connected to ground potential and a potential of 12 volts is applied to the VDD pin.

The output of "and" gate 125 is electrically connected to the second clock pin of a flip flop chip 132 which is of the same type as flip flop 130. The second reset pin of flip flop 132 is electrically connected to ground potential and the VSS pin is connected to ground potential.

The first Q pin of flip flop chip 130 is electrically connected to a junction point 149 which is electrically connected to the first input of a two input "and" gate 155. The first Q pin and the first data pin of flip flop chip 130 and including the second set pin of flip flop 132 are all electrically connected to a junction point 151. The second Q pin of flip flop chip 132 is electrically connected to the second input of a two input "and" gate 155. The second Q pin 12, and the second data pin 9 of flip flop chip 132 are electrically connected to a junction point 153.

The outputs from "and" gate 155 and the junction point 153, respectively, provides forward and reverse electrical command signals, to the forward-reverse switching circuit 87.

The outputs from junction point 149, providing an on-off electrical command signal, junction point 153 providing a reverse electrical commond signal, and junction point 128 providing a high speed electrical command signal, are supplied to the audio signal circuit 91.

Figure 5:
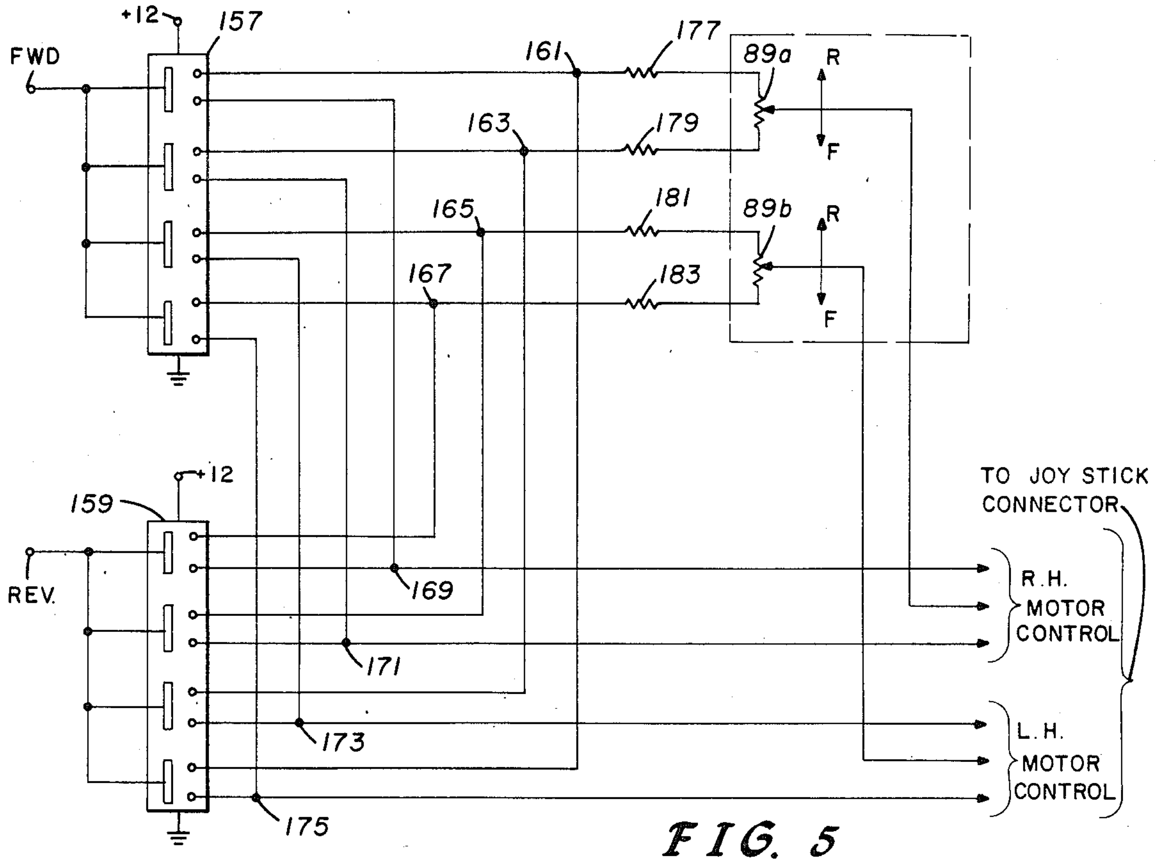
FIG. 5 is a schematic diagram of an forward-reverse switching circuit of the controller electrical circuit in accordance with the present invention.

The forward-reverse switching circuit illustrated in FIG. 5, in greater detail, includes forward and reverse commercially available quad bilateral switches 157, 159 identified by CD 4066 from RCA Corp. The forward electrical command signal from the control logic circuit in FIG. 4 is electrically connected to first, second, third and fourth control pins of the forward switch 157. A 12 volt potential is electrically connected to the forward switch VDD pin. The forward quad switch 157 has the following connections: the first input pin is connected to junction point 161, first output pin is connected to junction point 169, second input pin is connected to junction point 163, second output pin is connected to junction point 171, third input pin is connected to junction point 165, third output pin is connected to junction point 173, fourth input pin is connected to junction point 167, fourth output pin is electrically connected to junction point 175 and forward switch VSS pin is connected to ground potential.

The reverse signal from the control logic circuit in FIG. 4 is electrically connected to first, second, third and fourth control pins of the reverse quad switch 159. A 12 volt potential is electrically connected to reverse switch VDD pin. The reverse switch has the following connections, the first input pin is connected to junction point 167, first output pin is connected to junction 169, second input pin is connected to junction point 165, second output pin is connected to junction point 171, third input pin is connected to junction point 163, third output pin is electrically connected to junction point 173, fourth input pin is connected to point 161, fourth output pin is connected to junction point 175 and reverse switch VSS pin is connected to ground potential.

Junction point 161 is connected to resistor 177 which is connected to a first terminal of a right potentiometer 89*a*, the right power control device. Junction point 163 is connected to a resistor 179 which is connected to a junction point 185. Junction point 185 is connected to a second terminal of the right potentiometer 89*a*. Junction point 165 is connected to a resistor 181 which is connected to a first terminal of a second potentiometer 89*b*, the left power control device. Junction point 167 is connected to a resistor 183 which is connected to junction point 187. Junction point 187 is connected to a second terminal of the left potentiometer 89*b*. Resistor 177, 179, 181 and 183 form a voltage divider network.

Electrical connections from the tap of the right potentiometer 89*a*, junction point 169 and junction point 171 is provided to the joystick connector as the right motor control signal.

Electrical connections from the tap of the left potentiometer 89*b*, junction point 173 and junction point 175 is provided to the joystick connector as the left motor control signal.

The audio signal circuit illustrated in FIG. 6 in greater detail is electrically connected as described below. The reverse, high speed, and on-off electrical command signals from the control logic circuit of FIG. 4 are supplied to junction points 199,101, and 205 respectively. A low battery signal from the E and J electrical package is supplied to junction point 203. Junction point 199 is connected to a resistor 207 which is connected to a capacitor 223. The capacitor 223 is connected to junction point 221. Junction point 201 is connected to a resistor 209 which is connected to junction point 221. Junction point 203 is connected to a junction point 219 which is connected to a junction point 217. A capacitor 211 is connected between junction point 219 and ground potential. A resistor 215 is electrically connected between junction point 221 and junction point 217, in addition, a resistor 213 is connected between junction point 217 and ground potential. Junction point 221 is connected to the base of a transistor 231 having its collector connected to junction point 239 and its emitter connected to ground potential.

Junction point 205 is connected to resistor 225 which is connected to junction point 229. A capacitor 227 is connected between junction point 229 and ground potential. Junction point 229 is connected to the base of a transistor 233 having its collector connected to junction point 235 and its emitter connected to ground potential. A capacitor 237 is electrically connected between junction point 235 and a junction point 239.

A 24 volt potential is applied to the audio signal circuit through junction point 259 which is connected to capacitor 260. The capacitor 260 is also connected to ground potential. An on-off switch 257 is connected between junction point 259 and a resistor 253 which is connected to a junction point 251. A capacitor 249 is connected between junction point 251 and ground potential. Junction 251 is electrically connected to a junction point 245 which is connected to a capacitor 247. Capacitor 247 is connected to ground potential. Junction point 245 is connected to junction point 243 which is connected to a junction point 263 and a junction point 265. A resistor 241 is connected between junction point 243 and junction point 239, a resistor 267 is connected between junction point 263 and junction point 235.

The modulation input pin of a voltage controlled oscillator 236 identified by the number NE 566 as being commercially available from the Signetics Corporation is electrically connected to junction point 235. The voltage controlled oscillator 236, which provides the tone signals for operating a piezoelectric horn 20, is electrically connected in the following manner: resistor 269 is connected to the $V^+$ input pin of the voltage controlled oscillator 236, ground potential is applied to the ground pin, a capacitor 271 is connected between $C_1$ pin and ground potential, a resistor 269 is connected between junction point 265 and $R_1$ pin and the piezo electric horn 20 is connected to square wave output pin.

The chin actuated controller system as described above operates as follows:

With the control arm 11 being in its nondepressed position, the wheelchair is turned "on" and placed in the "low speed" "forward" mode of operation by moving the chin switch 16 forward to the actuated position for four seconds. The actuated position is accomplished by extending the chin of the occupying person in a forward direction. Movement of the chin switch to the nonactuated position is accomplished by maintaining the chin of the occupying person in an at rest normal position. A subsequent instantaneous forward movement of the chin pad puts the wheelchair in a "REVERSE" mode. The "low speed" "FORWARD" mode is again obtained by a second instantaneous forward movement of the chin pad. As is apparent, consecutive pushers of the chin pad cause the chair to alternate between low speed forward and reverse modes. To drive the chair at high speeds, the control arm 11 is urged slightly down by the patient, while the chin pad 17 is simultaneously pushed for two seconds. Upon release, the control arm 11 returns to its nondepressed position and the chair defaults to low speed. The five wheelchair operations, on, off, forward, reverse, and high speed are regulated by the two-position chin switch and the two position logic switch by use of the control logic circuit, which will be explained below along with the other circuits.

The control arm 11 is connected to the yoke assembly 18 by means of a vertical slip joint 19, provided to allow adjustment by the patient of the nondepressed vertical position corresponding to zero speed of the control arm 11. During normal use the control arm 11 is easily manipulatable through a vertical arc of approximately 10 degrees (from horizontal, for instance) and is manipulated within that arc to select varying speeds. Should the patient slouch into his seat, the patient may not be able to physically reach the chin pad 17 with his chin to urge the control arm 11 downward to its depressed position. The patient may, however, force the control arm 11 downward in a vertical direction with his head, for instance, beyond its 10 degree arc, as allowed by the vertical slip joint 19 creating a new, comfortable control arm nondepressed vertical position. The control arm 11 is still easily manipulatable through a new 10 degree arc, but the arc is vertically below its original position. Similarly, the control arm 11 moves freely, to the left and right through about 30 degrees, the horizontal motion of the control arm controlling the direction of the wheelchair when control arm 11 is simultaneously depressed. Should the patient slide in his chair to the left, the patient may not be able to adequately urge the control arm 11 to the right. Owing to a horizontal slip joint 21 connecting the spindle assembly 35 to the yoke assembly 18, the predetermined center position corresponding to straight ahead steering of the control arm in the horizontal plane is also adjustable. The patient, having slid to the left, urges the control arm 11 to the left and forces the spindle assembly 35 to turn within the horizontal slip joint 21. The new rest or center position is now shifted left with respect to the original center position, enabling the patient to move the control arm from the left, through the control arm's full arc, to the right.

As the control arm 11 moves through its up/down and left/right arcs, cam operating pin 33 is guided accordingly, and engages inner surfaces of cams 25, 27. The cams 25, 27 are mounted to overlap and are parallel to a back plate 28. Each cam is pivotably mounted, at a point of connection 41, 43 to the back plate 28. At another point of connection the cams are secured to potentiometers 49, 51 which extend as the respective cams 25, 27 pivot in order to alter the power from the power source. The piston shaped slots by virtue of the elongated horizontal portions permit the patient to move the control arm sideways when the wheelchair is stationary without causing forward, reverse or left-right operation of the wheelchair. This feature is necessary to permit the patient to move the control arm away from the front of the patient's face to eat, talk, read, etc. Pistol shaped slots 29, 31, again by their shape, determine the extension of the pivots in response to extension of and potentiometers 49, 52 in response to the motion of the cam operating pin 33. For instance, as the cam operating pin 33 moves down and left, both cams 25 and 27 pivot, in the same direction, causing the drive motors to turn the right wheel forward and the left wheel in reverse causing the wheelchair to remain stationary and spin left about its vertical axis. The wheelchair would spin right about its vertical axis if the cam operating pin 33 was to move down and right. If the cam operating pin 33 is moved downward and centered, the slope of the holes in each cam 25, 27 cause both cams to pivot symmetrically in opposite directions, causing the left and right drive motors to turn both wheels equally in either the forward or reverse direction (the forward or reverse direction being determined by the chin switch selection).

The operation of each of the circuits which make up the controller electrical circuits shall be described below.

The control logic circuit illustrated in FIG. 4, operates as follows:

The five modes of operation, i.e., ON, OFF, FORWARD, REVERSE, and HIGH SPEED provided by the chin switch is accomplished by the time constant of resistor 107 (R107) capacitor 111 (C111) and the logic switch 30 mounted on the second cam (shown in FIG. 2). The logic switch is normally closed when the control arm is fully up (the spring-returned, nondepressed position). At this position, holding the chin switch forward for 4 seconds will slowly charge up capacitor C111 through R107 until the clock input of flip-flop 130 is gated high by the output of "and" gate 117. This sets the Q output of flip-flop 130 high, which initiates "on" operation, and also enables flip-flop 132. A low signal from the Q output of flip flop 130 initiates off operation. Any subsequent 4 seconds push of the chin switch will alternately clock the flip-flop 132 Q output high or low initiating reverse or forward operation, respectively. The R107-C111 network also helps to prevent any subsequent inadvertent momentary push of the chin switch, from causing forward and reverse wheelchair operation. In other words the control logic circuit has a recognition function for recognizing intentional actuation of the chin switch causing forward or reverse operation. The diode 113 across R107 immediately discharges C111 when the chin switch is released. Thus, "ON," "FORWARD," "REVERSE," and "OFF" wheelchair operation may be selected, in that order.

The initiation of "High Speed" operation utilizes the same R107, C111 time constant. After "ON" is selected, depressing the control arm sets the logic switch 30 to its actuated or down position, enabling the "and" gate 121, while disabling the "and" gates 117 and 125. With the control arm depressed, the user then holds the chin switch forward for a two-second period. Capacitor C111 charges up through R107 and triggers "and" gate 121 high. The diode feedback 126 around "and" gate 121 clamps it high, turning off the optical switch 120 which causes the E&J electronic package to initiate "High Speed" operation. The controller stays in this state until the control arm (and the logic switch) is returned to its nondepressed position, reverting back to "low speed" operation.

The R107, C111, time constant is necessary for the "High Speed" mode of operation the chin switch is frequently actuated unintentionally while driving over door sills or rough terrain, etc. However, this accidental actuation of the chin switch is momentary and the signal is blocked by the R107, C11 time constant thereby causing the control logic circuit to recognize only intentional actuation of the chin switch.

The forward-reverse switching circuit, illustrated in FIG. 7, includes a forward quad bilateral switch, a reverse quad bilateral switch and a voltage divider network and operates as follows. The control gates of the forward and reverse switch 157 and 159 are connected to the forward and reverse electrical command signals, respectively, from the control logic circuit. In addition, the forward and reverse switches are electrically connected between the power source and the left and right power control devices. With the control gates to both bilateral switches low, the left and right power control devices are disconnected from the wheelchair electrical package, putting the wheelchair in an "OFF" mode. With either bilateral switch control gates high, permitting power to flow through the selected switch to the left and right power control devices, forward or reverse mode of wheelchair operation is selected.

The voltage divider resistor network is provided to adjust the voltage gradient across the power control devices. The cams are designed such that the operating members of power control devices travel 80% of their electrical displacement. This prevents excessive wear about a small area of the operating member element, as is common with joysticks using rotary potentiometers.

The voltage divider resistor network is a plug-in component and may be easily changed to increase or decrease control sensitivity. Decreased sensitivity of about −6 dB is very helpful for an inexperienced patient to begin with.

Figure 6:
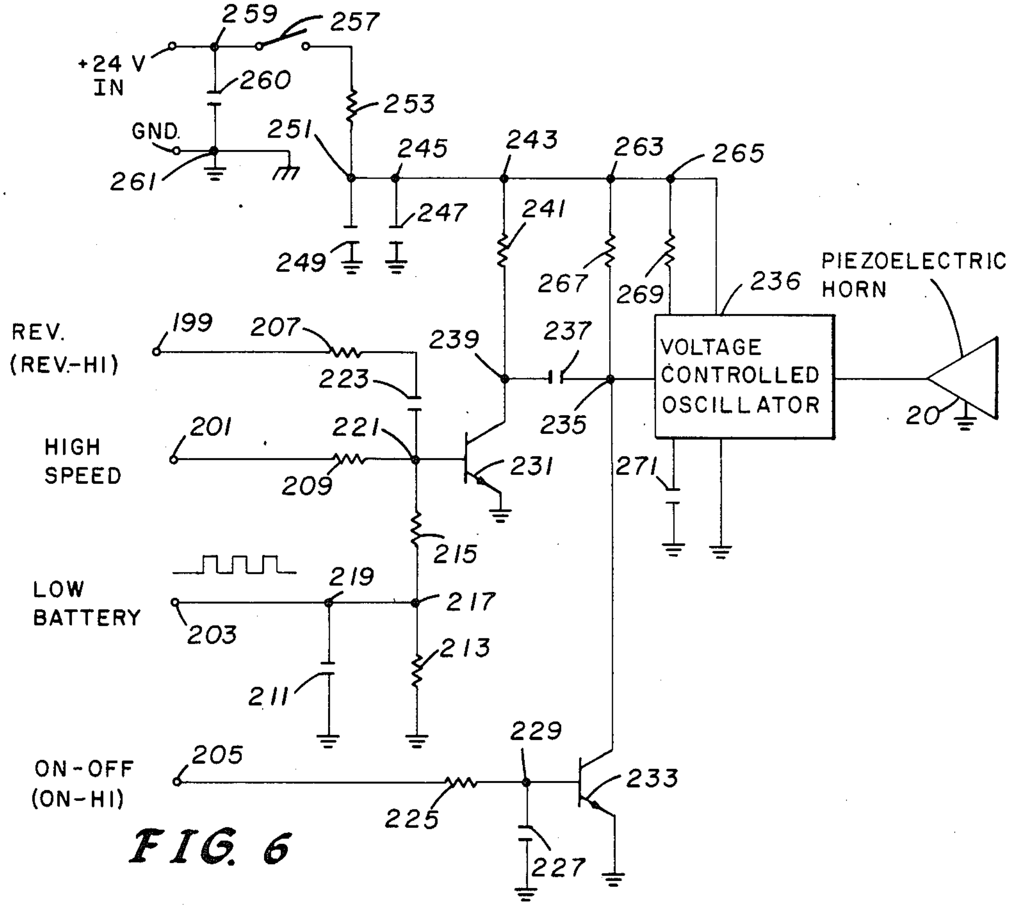
FIG. 6 is a schematic diagram of an audio signal circuit of the controller electrical circuit in accordance with the present invention.

The audio signal circuit, illustrated in FIG. 6, responds to the second, third and fourth electrical command signals received from the control logic circuit to produce five distinct tones indicating to the patient that the controller has initiated the selected operation. The electrical command signals from the control logic circuit are coupled through high impedance inputs to the audio signal circuit. A voltage controlled oscillator 236 having applied thereto a voltage corresponding to a selected electrical command signal producer an electrical frequency which is provided to directly drive a piezoelectric horn 20.

The "ON" signal produces a 1-second tone of increasing frequency generated by the time constant, of resistor 225 (R225) and capacitor 227 (C227), at the base of transistor 233 (T233). Conversely, the "OFF" signal produces a 5-second tone of decreasing frequency. With the "ON" signal present at T233, a "REVERSE" signal will produce a short "beep" tone. A "FORWARD" signal produces no tone in contrast to the "REVERSE" tone. A "HIGH SPEED" signal will produce a tone of increasing frequency but of about 0.5 second duration. One further tone for "LOW BATTERY" indication is provided by coupling a "low battery" signal, generated by the wheelchair electrical package, to the audio signal circuit through transistor 231 (T231) to produce a continous "beep, beep---" tone.

Having described a preferred embodiment of a novel chin actuated controller system in accordance with the present invention, it is believed that other modifications, variations and changes will be suggested to those skilled in the art in view of the teachings set forth herein. For example and as previously noted, although the illustrated embodiment has been described in connection with controlling a powered wheelchair, the chin controller of the present invention could also be used for controlling other apparatus in accordance with the switch actuations and proportional electrical signals produced by the controller in response to the chin movements of the user. It is, therefore, to be understood that all such variations, modifications and changes are believed to fall within the scope of the present invention as defined by the appended claims.

What is claimed is:

1. A chin acutated controller system for enabling a person to control, by chin movements, the operation of a powered apparatus responsive to proportional control signals, said chin actuated controller system comprising, in combination:

a control arm having a first end mounted for pivotal movement in a horizontal plane about a vertical axis in proportion to sideways movements of the chin of the person and in a vertical plane about a horizontal axis in proportion to vertical movements of the chin of the person and a distal end extending to a location adjacent the chin of the person controlling the powered apparatus;

a chin pad supported at the distal end of said control arm engageable by the person's chin, enabling the person to depress said control arm vertically and simultaneously swing said control arm horizontally by turning the person's head;

controller electrical circuit means including first and second power control means for controlling the supply of power from a power source to said powered apparatus, said first and second power control means each having an operating member movable to adjust the power supplied to the powered apparatus; and cam mechanism means operatively connecting said control arm to each operating member of said first and second power control means for transmitting movement thereto in response to the chin activated pivotal movements of said control arm, thereby producing proportional control signals to said powered apparatus in proportion to the vertical depression of said control arm about said horizontal axis and sideways left or right movement of said control arm about said vertical axis.

2. The chin actuated controller system according to claim 1 wherein said control arm is mounted for pivotal motion about two perpendicular axes;

the first axis being vertical and the control arm moving in a horizontal plane about said vertical axis in proportion to sideways movements of the person's chin; and the second axis being horizontal and the control arm moving in a vertical plane about said horizontal axis in proportion to vertical movement of the person's chin, the length of the control arm between the person's chin and pivotal axes being preselected to cause control motions of the person's chin to be readily detectable pivotal movements of said control arm about each of said axes.

3. The chin actuated controller system according to claim 2 wherein said chin pad further comprises:

a chin switch supported on the distal end of said control arm and having a nonactuated position accomplished by maintaining the chin of the person in an at rest normal position and an actuated position accomplished by extending the chin of the person in a forward direction, said chin switch provides first and second electrical signals indicating the nonactuated and actuated positions, respectively, said chin switch producing switch actuation signals to said powered apparatus.

4. The chin actuated controller system according to claim 3 wherein said chin switch is biased to the nonactuated position.

5. The chin actuated controller system of claim 4 wherein said cam mechanism means comprises:

a back plate;

first cam means having a first slot placed within said first cam means, a first point of connection pivotally mounted to said back plate permitting pivotal movement of said first cam means, and a second point of connection, different from said first point of connection, connected to the operating member of said first power control means to cause movement of the operating member of said first power control means in proportion to the pivotal movement of said first cam means;

second cam means, adjacent said first cam means, having a second slot placed within said second cam means in a position overlapping said first slot, a third point of connection pivotally mounted to said back plate permitting pivotal movement of said second cam means and a fourth point of connection, different from said third point of connection, connected to the operating member of said second power control means to cause movement of the operating member of said second power control means in proportion to the pivotal movement of said second cam means;

a cam operating pin, operatively connected to said control arm, for engaging the overlapping inner surfaces of each slot to cause pivotal movement of said first and second cam means in response to the chin activated pivotal movements of said control arm.

6. The cam mechanism means according to claim 5 wherein said first slot has a pistol shape which includes a first vertical triangular portion integral with a first elongated horizontal portion and said second slot has a pistol shape which includes a second vertical triangular portion integral with a second elongated horizontal portion which overlaps and points in the opposite direction of said first elongated horizontal portion, whereby, said first and second slots combine to cause said cam mechanism means to simulate an "X" axis configuration joystick.

7. The cam mechanism means according to claim 6 wherein said overlapping first and second horizontal portions of said first and second slots permit the person to move the control arm and chin pad combination sideways away from the front of the person's face without causing powered apparatus operation.

8. The chin actuated controller system according to claim 7 wherein the first end of said control arm is connected to a yoke assembly which provides for pivotal motion of said control arm about two perpendicular axes.

9. The chin actuated controller system according to claim 8 wherein said yoke assembly comprises:

a vertical slip joint means for permitting the person to adjust the nondepressed vertical position of said control arm by vertical movement of the person's head; and a horizontal slip joint means for permitting the person to adjust the horizontal center position of the control arm and chin pad combination by turning the person's head sideways.

10. The cam mechanism means according to claim 9 wherein said cam operating pin is perpendicularly connected to a spindle assembly which is operatingly connected to said yoke assembly.

11. The cam mechanism means according to claim 10 wherein said spindle assembly comprises:

a spindle tube having a slotted hole through which said cam operating pin perpendicularly extends;

a hollow plunger, position within said spindle tube having a hole for receiving said cam operating pin; and a locking pin positioned within said hollow plunger and extending through said cam operating pin, thereby, locking said cam operating pin in a stationary position.

12. The cam mechanism means of claim 11 wherein said spindle assembly further comprises:

biasing means within said spindle tube for biasing said hollow plunger in an upward direction, thereby, causing said control arm to be in a nondepressed vertical position corresponding to zero movement for the powered apparatus.

13. The cam mechanism of claim 12 further comprising:

spring biasing means connected between a fifth point of connection on said first cam means and a sixth point of connection on said second cam means, wherein said spring biasing means biases the first and second cam means against pivotal movement.

14. The chin actuated controller system of claim 13 further comprising:

detent means for enabling the person to recognize when the control arm is in said predetermined center position corresponding to zero proportional movement of the power apparatus.

15. The chin actuated controller system according to claim 14 further comprising:

a logic switch operatively connected to said control arm and having a nonactuated position which corresponds to the nondepressed position of said control arm and an actuated position which corresponds to the depressed position of said control arm, said logic switch provides a first and second electrical signal indicating the nondepressed and depressed positions, respectively of the control arm, said logic switch producing switch actuation signals to said powered apparatus.

16. The chin actuated controller system according to claim 15 wherein said logic switch is biased to the nonactuated position which corresponds to the nondepressed position of the control arm.

17. The chin actuated controller system according to claim 16 wherein said controller electrical circuit means is responsive to the electrical signals from said chin switch and said logic switch to cause selected powered apparatus operation.

18. The chin actuated controller system according to claim 17 wherein said controller electrical circuit means comprises:

control logic circuit means for providing a plurality of electrical command signals in response to the electrical signals received from said chin switch and said logic switch, said plurality of electrical command signals being a first electrical command signal for initiating a first powered apparatus operation, a second electrical command signal for initiating a second powered apparatus operation, a third electrical command signal for initiating a third powered operation and a fourth electrical command signal for initiating a fourth powered apparatus operation;

switching circuit means having first switch means electrically connected between a power source and said first and second power control means and second switch means electrically connected between said power source and said first and second power control means, said first switch means and said second switch means being selectively enabled by said first and second electrical command signals respectively, thereby, permitting power to flow through the selected switch means to said first and second power control means initiating the selected power apparatus operation; and audio signal circuit means which responds to said first, second, third and fourth electrical command signals received from said control logic circuit means and produces an audible sound indicating the initiation of the selected powered apparatus operation.

19. The controller electrical circuit means according to claim 18 wherein said control logic circuit means further comprises:

recognition means for recognizing intentional actuation of said chin switch causing user controlled switching between the first, second, third and fourth powered apparatus operations.

20. The controller electrical circuit means according to claim 19 wherein said switching circuit means further comprises:

voltage divider resistor network means for adjusting the power gradient across said first and second power control means.

21. The controller electrical circuit means according to claim 20 wherein said first and second cam means of said cam mechanism means cause each operating member of said first and second power control means to travel 80% of their electrical displacement, thereby preventing excessive wear about a small area of each operating member.

22. The controller electrical circuit means according to claim 21 wherein said audio circuit means further comprises:

means for producing an audible sound in response to a signal indicating low battery power.

23. The controller electrical circuit means according to claim 22 wherein said audio circuit means comprises:

a voltage controlled oscillator means for producing an electrical frequency signal in response to a voltage applied thereto corresponding to a selected electrical command signal; and a piezoelectric horn means for producing an audible sound in response to the electrical frequency signal provided by said voltage controlled oscillator.

24. A chin actuated controller system for enabling a person with limited mobility to control, by chin movements, the left and right drive motor means of a powered wheelchair or the like in order to control the speed and left-right steering of the wheelchair, said chin actuated controller system comprising, in combination:

a control arm having a first end mounted adjacent the rear of the wheelchair for pivotal movement in a horizontal plane about a vertical axis is proportion to sideways movements of the chin of the person and in a vertical plane about a horizontal axis in proportion to vertical movements of the chin of the person and a distal end extending to a location adjacent the chin of the person occupying the wheelchair;

a chin pad supported at the distal end of said control arm engageable by the person's chin, enabling the person to depress said control arm vertically and simultaneously swing said control arm horizontally by turning the person's head;

controller electrical circuit means including left and right power control means for controlling the supply of power from a power source to said left and right drive motor means respectively, said left and right power control means each having an operating member movable to alter the power supplied to the respectively controlled drive motor means; and cam mechanism means operatively connecting said control arm to each operating member of said left and right power control means for transmitting movement thereto in response to the chin activated pivotal movements of said control arm, thereby controlling said left and right drive motor means to vary the speed of the wheelchair in proportion to the vertical depression of said control arm about said horizontal axis and the left-right steering of the wheelchair in proportion to the sideways left or right movement of said control arm about said vertical axis.

25. The chin actuated controller system according to claim 24 wherein said control arm is mounted adjacent the rear of the wheelchair for pivotal motion about two perpendicular axes;

the first axis being vertical and the control arm moving in a horizontal plane about said vertical axis in proportion to sideways movements of the person's chin; and the second axis being horizontal and the control arm moving in a vertical plane about said horizontal axis in proportion to vertical movement of the person's chin, the length of the control arm between the person's chin and pivotal axes being preselected to cause control motions of the person's chin to be readily detectable pivotal movements of said control arm about each of said axes.

26. The chin actuated controller system according to claim 25 wherein said chin pad further comprises:

a chin switch supported on the distal end of said control arm and having a nonactuated position accomplished by maintaining the chin of the occupying person in an at rest normal position and an actuated position accomplished by extending the chin of the occupying person in a forward direction, said chin switch provides first and second electrical signals indicating the nonactuated and actuated positions, respectively.

27. The chin actuated controller system according to claim 26 wherein said chin switch is biased to the nonactuated position.

28. The chin actuated controller system of claim 27 wherein said cam mechanism means comprises:

a back plate;

first cam means having a first slot placed within said first cam means a first point of connection pivotally mounted to said back plate permitting pivotal movement of said first cam means, and a second point of connection, different from said first point of connection, connected to the operating member of said left power control means to cause movement of the operating member of said left power control means in proportion to the pivotal movement of said first cam means;

second cam means, adjacent said first cam means, having a position overlapping said first slot, a third point of connection pivotally mounted to said back plate permitting pivotal movement of said second cam means, and a fourth point of connection, different from said third point of connection, connected to the operating member of said right power control means to cause movement of the operating member of said right power control means in proportion to the pivotal movement of said second cam means;

a cam operating pin, operatively connected to said control arm, for engaging the overlapping inner surfaces each slot to cause pivotal movement of said first and second arm means in response to the chin activated pivotal movements of said control arm.

29. The cam mechanism means according to claim 28 wherein said first slot has a pistol shape which includes a first vertical triangular portion integral with a first elongated horizontal portion and said second slot has a pistol shape which includes a second vertical triangular portion integral with a second elongated horizontal portion which overlaps and points in the opposite direction of said first elongated horizontal portion, whereby, said first and second slots combine to cause said cam means means to simulate an "X" axis configuration joystick.

30. The cam mechanism means according to claim 29 wherein said overlapping first and second horizontal portions of said first and second slots permit the patient to move the control arm and chin pad combination sideways away from the front of the patient's face without causing wheelchair operation.

31. The chin actuated controller system according to claim 30 wherein the first end of said control arm mounted adjacent the rear of the wheelchair is connected to a yoke assembly which provides for pivotal motion of said control arm about two perpendicular axes.

32. The chin actuated controller system according to claim 31 wherein said yoke assembly comprises:

a vertical slip joint means for permitting the occupying person to adjust the nondepresed vertical position of said control arm by vertical movement of the occupying person's head; and a horizontal slip joint means for permitting the occupying person to adjust the horizontal center of the position of the control arm and chin pad combination by turning the occupying person's head sideways.

33. The cam mechanism means according to claim 32 wherein said cam operating pin is perpendicularly connected to a spindle assembly which is operatively connected to said yoke assembly.

34. The cam mechanism means according to claim 33 wherein said spindle assembly comprises:

a spindle tube having a slotted hole through which said cam operating pin perpendicularly extends;

a hollow plunger, positioned within said spindle tube having a hole for receiving said cam operating pin; and a locking pin positioned within said hollow plunger and extending through said cam operating pin, thereby, locking said cam operating pin a stationary position.

35. The cam mechanism means of claim 34 wherein said spindle assembly further comprises:

biasing means within said spindle tube for biasing said hollow plunger in an upward direction, thereby, causing said control arm to be in a nondepressed vertical position corresponding to zero speed for the wheelchair.

36. The cam mechanism of claim 35 further comprising:

spring biasing means connected between a fifth point of connection on said first cam means and a sixth point of connection on said second cam means, wherein, said spring biasing means biases the first and second cam means against pivotal movement.

37. The chin actuated controller system of claim 36 further comprising:

detent means for enabling the person to recognize when the control arm is in said predetermined center position corresponding to straight ahead steering.

38. The chin actuated controller system according to claim 37 further comprising:

a logic switch operatively connected to said control arm and having a nonactuated position which corresponds to the nondepressed position of said control arm and an actuated position which corresponds to the depressed position of said control arm, said logic switch provides a first and second electrical signal indicating the nondepressed and depressed positions, respectively of the control arm.

39. The chin actuated controller system according to claim 38 wherein said logic switch is biased to the nonactuated position which corresponds to the nondepressed position of the control arm.

40. The chin actuated controller system according to claim 39 wherein said controller electrical circuit means is responsive to the electrical signals from said chin switch and said logic switch to selectively control said left and right drive motor means to cause forward, reverse, high-speed and on-off wheelchair operation.

41. The chin actuated controller system according to claim 40 wherein said controller electrical circuit means comprises:

control logic circuit means for providing a plurality of electrical command signals in reponse to the electrical signals received from said chin switch and said logic switch, said plurality of electrical command signals being a first electrical command signal for initiating forward operation, a second electrical command signal for initiating reverse operation, a third electrical command signal for initiating on-off operation and a fourth electrical command signal for initiating high-speed operation;

forward-reverse switching circuit means having forward switch means electrically connected between a power source and said left and right power control means and reverse switch means electrically connected between said power source and said left and right power control means, said forward switch means and said reverse switch means being selectively enabled by said first and second electrical command signals respectively, thereby, permitting power to flow through the selected switch means to said left and right power control means initiating the selected wheelchair operation; and audio signal circuit means which responds to said second, third and fourth electrical command signals received from said control logic circuit means and produces an audible sound indicating the initiation of the selected wheelchair operation.

42. The controller electrical circuit means according to claim 41 wherein said control logic circuit means further comprises:

recognition means for recognizing intentional actuation of said chin switch causing patient controlled switching between forward and reverse wheelchair operation and high speed and low speed wheelchair operation.

43. The controller electrical circuit means according to claim 42 wherein said forward-reverse switching circuit means further comprises:

voltage divider resistor network means for adjusting the power gradient across said left and right power control means.

44. The controller electrical circuit means according to claim 43 wherein said first and second cam means of said cam mechanism means cause each operating member of said left and right power control means to travel 80% of their electrical displacement, thereby preventing excessive wear about a small area of each operating member.

45. The controller electrical circuit means according to claim 44 wherein said controller electrical circuit means further comprises:

means for causing said left and right drive motor means to turn in opposite directions causing the wheelchair to remain stationary and spin about its vertical axis.

46. The controller electrical circuit means according to claim 45 wherein said audio circuit means further comprises:

means for producing an audible sound in response to a signal indicating low battery power.

47. The controller electrical circuit means according to claim 46 wherein said audio circuit means comprises:

a voltage controlled oscillator means for producing an electrical frequency signal in response to a voltage applied thereto corresponding to a selected electrical command signal; and a piezoelectric horn means for producing an audible sound in response to the electrical frequency signal provided by said voltage controlled oscillator.

* * * * *

UNITED STATES PATENT AND TRADEMARK OFFICE
CERTIFICATE OF CORRECTION

PATENT NO. : 4,679,644

DATED : July 14, 1987

INVENTOR(S) : John H. Loveless

It is certified that error appears in the above—identified patent and that said Letters Patent is hereby corrected as shown below:

In the claims:

Column 17, line 13, after "having", insert -- a second slot placed within said second cam means in --.

Column 17, line 26, after "second", delete "arm" and insert -- cam --.

Column 17, line 38, delete first occurrence of "means" and insert -- mechanism --.

Column 17, line 59, delete "of the".

Signed and Sealed this

First Day of December, 1987

*Attest:*

DONALD J. QUIGG

*Attesting Officer* | *Commissioner of Patents and Trademarks*